United States Patent [19]
Rustecki

[11] 4,007,386
[45] Feb. 8, 1977

[54] ELECTRIC INDUCTION DRIVE ASSEMBLIES

[76] Inventor: Romuald Zdzislaw Rustecki, 99 Chertsey Lane, Staines, Middlesex, England

[22] Filed: May 16, 1975

[21] Appl. No.: 578,095

Related U.S. Application Data

[63] Continuation of Ser. No. 425,738, Dec. 18, 1973, abandoned.

[52] U.S. Cl. .................................. 310/42; 310/166; 310/186; 310/268
[51] Int. Cl.² ........................................ H02K 15/14
[58] Field of Search ............... 310/268, 166, 42, 67, 310/66, 105, 186; 318/293

[56] References Cited

UNITED STATES PATENTS

| 2,469,808 | 5/1949 | Aske | 310/268 |
| 2,635,547 | 4/1953 | Cataldo | 310/268 UX |
| 2,724,067 | 11/1955 | Herrick | 310/268 |
| 2,824,275 | 2/1958 | Kober | 310/268 |
| 3,171,356 | 3/1965 | Pensabene | 310/268 X |
| 3,223,867 | 12/1965 | Shapiro | 310/166 |
| 3,277,323 | 10/1966 | Parker | 310/268 X |

*Primary Examiner*—Donovan F. Duggan
*Attorney, Agent, or Firm*—Hill, Gross, Simpson

[57] ABSTRACT

Electric induction motors are either of the cylindrical or axial air-gap types; disadvantages of the former type, which is the more common in use, are in part overcome by the latter type, but the invention provides a new concept in electric induction motors and drive assemblies of the axial air-gap type, which eliminates the need for maintenance and substantially removes the need for skilled personnel for inspection, cleaning, modification or even installation. Induction drives according to the invention have a virtually instantaneously replaceable stator core, so that a failed stator winding can be overcome by removing it and fitting a new one, so that continued use of the electric drive can be resumed after a few minutes downtime only. Various structural arrangements for achieving this are disclosed. Induction drives according to the invention also have dynamically balanced rotor structures, which operate so as to generate, in use, electrodynamic repulsive forces which oppose and at least partly nullify the normal electromagnetic attractive forces between the rotors and stators. The induction drives of the invention makes much improved use of the copper and other expensive conductive materials necessitated and include a range of other structural and operational improvements as compared with known electric motors and drives.

10 Claims, 9 Drawing Figures

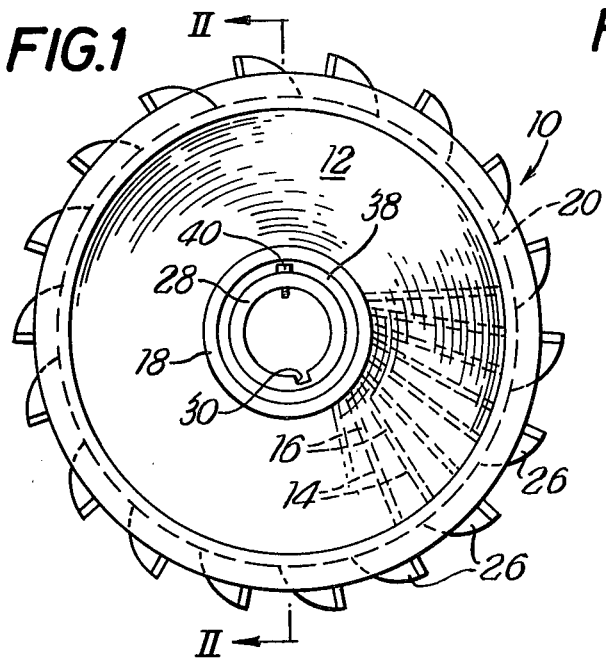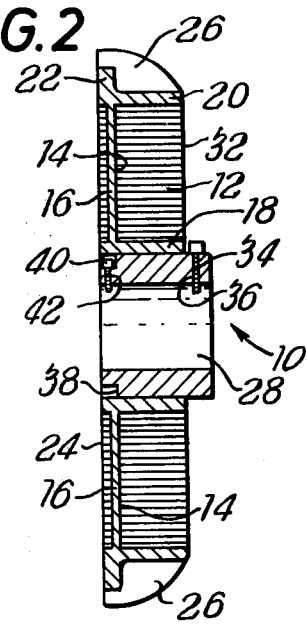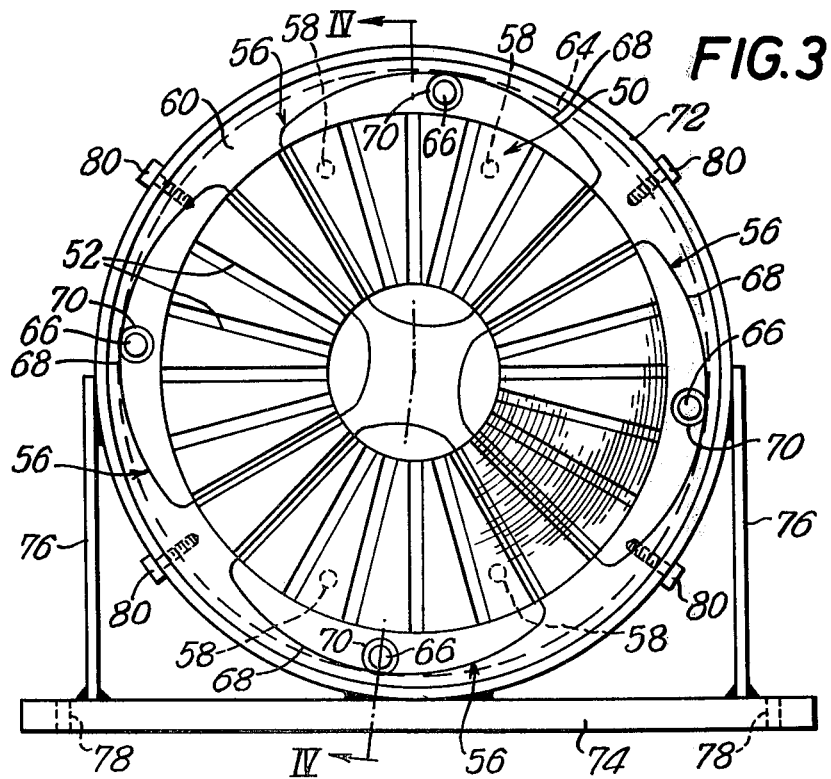

ELECTRIC INDUCTION DRIVE ASSEMBLIES

This is a continuation of application Ser. No. 425,738, filed Dec. 18, 1973, now abandoned.

BACKGROUND AND SUMMARY OF THE INVENTION

This invention relates to electric induction motors and, more particularly, to induction motors of the axial air gap type.

Induction motors of the axial air gap type have overcome some disadvantages associated with the conventional "cylindrical" type of induction motor. For example, the rotor of an axial gap motor can be entirely supported by the load to be driven by the motor, so that the motor itself need not contain the rotor bearings and associated parts required in a conventional cylindrical machine. However, axial air gap motors have not been commercially successful in any large way and this is believed to be at least in part due to the fact that such motors heretofore designed have incorporated a large number of the disadvantages and restrictive features of the conventional cylindrical machines. For example, some known designs relate to a combined special-purpose motor and pump or compressor unit. The stator component, on the one hand, and the rotor and pump or compressor components, on the other hand, are mounted in separate, mating housing parts, which are assembled together with a sealing member sandwiched between them. Therefore, because part of the motor is a totally integral part of the load device and because the two housing parts are designed and manufactured so as to mate together to form a unitary housing assembly, the motor is not suitable for general purpose use, as is the conventional type of motor. Also, because the whole motor is totally enclosed in the housing parts, cooling of the motor becomes a problem.

A particular problem resides in the fact that these known combination units have to be dismantled by skilled electricians for the purpose of maintenance and repair, e.g. should the stator winding burn out. While this may not pose an insuperable difficulty to the large-scale user in an industrial country (i.e. assuming he has an adequate supply of skilled labour), to a small user, particularly in an undeveloped country, skilled help may not be available and therefore the need to carry out an unexpected repair or maintenance operation may be a tremendous nuisance, particularly when the motor is being used in a continuous processing application and more particularly when the process is of a short-term, high-volume seasonal nature, e.g. the processing of agricultural products.

Another disadvantage of known induction motors, whether of the conventional type or of the axial air gap type, resides in the fact that their operating speeds are not variable, or at least not variable without the provision of expensive and complex ancilliary equipment. In some applications, it is highly desirable that the speed of operation of a motor be changed from time to time, e.g. to change the operating speed of an item of plant in accordance with the nature of a product to be treated or to entirely up-rate a plant. In the former case, it is generally necessary to employ a variable speed transmission, which involves increased cost and reduced efficiency and reliability; in the latter case, the motor may have to be entirely replaced.

It is an object of the present invention, as viewed from one aspect, to provide an electric induction drive assembly in which maintenance is not required; in which inspection and cleaning can be carried out by virtually unskilled labour; which can be modified to run at a different speed by virtually unskilled labour; and which can preferably be installed by virtually unskilled labour.

According to this aspect of the present invention, an electric induction drive assembly comprises a rotor formed from an annular core of magnetic material, radially inner and outer shorting rings between which the core extends and a plurality of rotor bars each extending generally radially between the inner and outer shorting rings, the rotor being coaxially attached to or attachable to a shaft of a load to be driven by the drive assembly, a stator comprising an annular core of magnetic material having windings arranged thereon to produce a magnetic field extending axially from one face of the core, a structure supporting the stator so that, by appropriate positioning of the structure with respect to the load shaft, the drive assembly may be made operable by positioning the stator core with said face thereof confronting one face of the rotor core and spaced by a predetermined amount from said face of the rotor core, the stator and the support structure, on the other hand, being formed as entirely discrete elements, and means releasably securing the stator core in a desired position with respect to the support structure and in such a manner that the stator core and the windings thereon can be removed from and replaced on the support structure when the assembly is arranged in the operable condition without movement of the support structure.

As those skilled in the art will know, when a load is to be driven by an electric motor, so called "half-couplings" are secured to both the load input shaft and the motor output shaft and, after very careful positioning of the motor so that the axes of the two shafts are precisely aligned, the two half-couplings are bolted together. The rotor of the present drive assembly is thus desirably so formed as to be simply securable to the load shaft in the same manner as a conventional half-coupling, whereby it can be fitted to the shaft, literally in moments, by anyone capable of using a screwdriver, wrench or Allen key. The rotor, which is the planar equivalent of the cylindrical squirrel-cage rotor used in conventional cylindrical induction motors, is for all practical purposes electrically indestructible and therefore, once installed, requires no attention. The stator and support structure are fitted in place, either before or after the rotor is fitted, as the case may be, as is described in more detail below.

Provided the rotor will fit on to the shaft and provided the rating of the drive assembly is adequate for the load, a particular drive assembly can be used in a variety of applications and can thus be ordered from the manufacturer on an "off the shelf" basis.

As was mentioned before, the rotor is virtually electrically indestructible and thus the only parts which can fail electrically are the stator windings. As the stator core together with the windings thereon is removable from the support structure without disturbance of the latter, should the stator windings burn out the core can be simply removed by unskilled personnel and replaced by anew one: no casing has to be opened and dismantled to allow access to the stator. In the same way, an undamaged stator can be removed for inspection and- /or cleaning and then replaced. The services of a skilled electrician or engineer are never normally required.

The simple replaceability of the stator core and windings gives rise to another important advantage. The speed of the motor can be quickly changed by removing the stator and replacing it by another stator of the same size, but wound so as to have a different number of poles and therefore a different synchronous speed. In a preferred form of the invention, the support structure comprises an open-ended cylindrical frame arranged coaxially of the stator core and the means releasably securing the stator core comprise a plurality of threaded members extending radially inwardly through apertures in the frame. The core and windings are removed in a very straightforward manner by simply unscrewing the threaded members and withdrawing the core and windings from the frame. The same core or a replacement core can then be replaced in converse manner. If a replacement core is at hand, the whole withdrawal and replacement operation takes only a few minutes.

The means releasably securing the stator core may further comprise a plate which fits within the frame and is secured in place by the threaded members which are screwed into tapped holes in the plate, the stator being secured to the plate with said face thereof remote from the plate. With this arrangement, due to the fact that the plate fits within the frame, the location of the threaded members when replacing the core is simplified. The stator core may be secured to the plate by a plurality of axially-directed screws, which extend through apertures in the plate and into tapped holes in the core. Thus, when the plate has been withdrawn, the core and windings may be simply and quickly unscrewed from the plate and a replacement fitted to the plate, which is then reaffixed to the frame.

In an alternative arrangement, the plate is not provided, the threaded members being screwed directly into tapped holes in the stator core. This arrangement has the merits of cheapness and simplicity and also allows good circulation of air between the core and the frame. This arrangement is preferred for convenience to the plate mounting arrangement when, as described below, the stator has windings on both faces.

The support structure may include a flat base member secured to the cylindrical frame and lying in a plane parallel to the axis of the frame. Installation of the assembly is thereby greatly facilitated: the support structure, resting on the base member, is moved about until the rotor and stator are coaxial and have the required nominal air gap between their confronting faces. As the transmission of torque between the stator and rotor is accomplished entirely electromagnetically rather than mechanically, the rotor being supported solely by the load shaft, the alignment step is by no means the skilled precision operation necessary when installing a conventional cylindrical induction motor. In fact, somewhat surprisingly in view of the fact that in prior axial air gap machines pains have been taken to precisely align the rotor and stator and to accurately determine the spacing between them by fixing them in interfitting housing parts, it has been found that the present drive assembly will operate satisfactorily without any significant loss of efficiency or any excessive vibration if the axes are slightly inclined or mutually spaced and/or if the air gap departs significantly from the nominal value. This being so, the positioning of the stator support structure can be carried out by unskilled personnel. The structure merely has to be moved until the rotor and stator are more or less coaxial and the average air gap thickness as measured around the periphery is within about 10% of the nominal value, which varies upwardly from 2.5 mm for a 1 horsepower motor. The base member preferably has apertures therein for receiving fixing members (e.g. bolts), whereby the support structure can be fixed in place once it has been correctly positioned.

To cater for an alternative way of fixing the support structure, the cylindrical frame may have attached thereto, instead of or as well as the base member, a plurality of axially-extending sockets for receiving fixing members, whereby the structure can be secured to a surface lying in a plane perpendicular to the axis of the frame. In this way, the frame can be attached, for example, to the casing of the load or to a framework associated with or forming part of the load. In this case, it may be convenient for the load shaft to extend through the centre of the stator so that the rotor is fitted outside the stator, although the rotor can be fitted inside the stator if there is room, e.g. if the frame is fitted around the lip of a recess.

A phenomenon encountered with known axial air gap motors which can sometimes give rise to problems resides in the axial thrust imparted to the rotor, in use, by electromagnetic action between the rotor and the stator. As an axial air gap induction motor is run up to operating speed from standstill, the rotor and stator first repel one another. The repulsive force decreases as the speed increases and falls to zero at about 45% of synchronous speed. Above this speed value and more particularly at the operating speed, the force becomes one of attraction, the force varying in accordance with the stator current due to its electromagnetic nature.

If the load shaft is mounted in a good thrust bearing, the axial thrust presents little or no problem. However, if the load shaft is not provided with a thrust bearing, or if the thrust bearing is worn, the axial thrust may cause the air gap width to be reduced below acceptable limits, and in extreme cases may give rise to rubbing between the rotor and the stator.

It is an object of the invention, as viewed from a second aspect, to provide an electric induction drive assembly in which the axial thrust due to the electromagnetic attraction between the rotor and stator is at least partly counteracted.

In accordance with this aspect of the present invention, an electric drive assembly comprises a rotor having an annular core of magnetic material, a stator comprising an annular core of magnetic material having windings arranged thereon to produce a magnetic field extending axially from one face of the core, means for positioning the rotor and stator so that said face of the stator core confronts one face of the rotor core with the two faces spaced apart by a predetermined amount, a plurality of electromagnets fixed with respect to the stator and energized by the current flowing through the stator windings, and an electrically-conductive non-magnetic part provided on the rotor and confronting said electromagnets, whereby an electrodynamic repulsive force is produced between the rotor and the stator which opposes the electromagnetic attractive force between the rotor and the stator.

Also, in accordance with this second aspect of the invention, in an assembly in accordance with the first aspect set forth above, a plurality of electromagnets energized by the current flowing through the stator windings are fixed relative to the stator and the rotor is provided with an electrically-conductive non-magnetic part which confronts said electromagnets in the operable condition of the apparatus, whereby an electrodynamic repulsive force is produced, in use, between the rotor and stator which opposes the electromagnetic attractive force between the rotor and the stator.

Although in some cases it may be sufficient only partly to counteract the electromagnetic attractive force, the assembly is preferably so designed that the two forces completely nullify one another. As both forces are dependent on the current through the stator windings, they substantially cancel each other out as the current varies with variation in the load torque. Moreover, as both forces are speed dependent, they also substantially cancel each other out as the speed of the motor varies, in use, with the load.

The electromagnets may comprise magnetic yokes having pole pitch traversing parts of the stator windings wound around them. In this way, copper wastage is minimized by using those parts of the windings which otherwise would produce no useful effect. The electrically-conductive non-magnetic part and the electromagnets may be mounted on the outer or on the inner periphery of the rotor, as desired. In the above described arrangement in which the stator core is mounted on a plate which fits within a cylindrical frame, the yokes may extend axially from the part of the plate between the outer periphery of the stator core and the frame. As this space must in any event be provided to accommodate the pole pitch traversing parts of the stator winding, no increase in size of the stator support structure is necessary to accommodate the yokes.

If the electrically-conductive non-magnetic part of the rotor is on the outer periphery of the rotor, it is desirably made integral with the outer shorting ring to enable the two (together with the rotor bars and the inner shorting ring) to be cast together in one operation. In a preferred arrangement, the electrically-conductive non-magnetic part of the rotor is in the form of a continuous ring which extends around the entire outer periphery of the rotor and lies in a plane perpendicular to the axis of the rotor. A continuous ring ensures in a simple manner that the force does not vary over the cycle of rotation, though a continuous force can be maintained even if the electrically-conductive non-magnetic part is discontinuous, by appropriately disposing the electromagnets and possibly by distributing them among the phases, if the drive assembly is polyphase.

Although the parts of the drive assembly of the invention are well cooled as compared with known devices, due to the fact that the drive assembly is not enclosed in a casing, in some cases forced cooling may be needed. In this case, cooling fan blades may be formed integrally with the electrically-conductive non-magnetic part of the rotor and the outer shorting ring.

In accordance with one particular way of carrying the invention into effect, the stator core has windings arranged in slots on both faces thereof, so as to produce magnetic fields extending axially away from both faces of the core, and a second rotor of like construction is provided, the arrangement being such that each face of the stator core confronts a face of a respective one of the rotor cores, the stator windings being arranged so that both rotors are rotated in the same rotational sense. With this arrangement, substantially twice the torque can be obtained from a stator of a given size.

In the stators of conventional cylindrical induction machines, the copper (or other conductive material) forming the pole pitch traversing parts of the windings produces no useful motive effect. The ratio of this non-useful copper to useful copper, i.e. the copper in the core slots, in typically of the order of 1.25:1. The non-useful copper involves a considerable extra expense. In axial air gap motors having annular stator cores, the above ratio is decreased and can be reduced to less than 1:1. However, this still represents a lot of wasted copper. In the above-described twin rotor arrangement, the amount of wasted copper can be greatly reduced. The windings on both faces of the stator core are formed together, the conductors, as they emerge from the outer exit of each slot, being directed substantially axially over the outer periphery of the stator core to an adjacent slot on the other side of the core. In this way, the wasted copper solely traverses the axial width of the stator core, rather than a large portion of the inner and outer peripheries of the core, and the proportion of wasted copper is therefore small. As the ratio of the axial width to the outer diameter of the core can be decreased as the size of the stator core is increased, the saving in copper is greater for larger drive assemblies. The ratio of wasted to useful copper approaches a very small value as the size of the stator core is increased.

BRIEF DESCRIPTION OF THE DRAWINGS

The invention will be more readily understood from a consideration of the following description, given by way of example only, of various embodiments thereof illustrated in the accompanying drawings, in which:

FIG. 1 is an end view (from the stator side) of a rotor designed for use in a drive assembly in accordance with the present invention;

FIG. 2 is a cross-sectional view of the rotor shown in FIG. 1 and taken along the line II—II of FIG. 1;

FIG. 3 is an end view (from the rotor side) of a stator and support structure therefor, intended for use with the rotor of FIGS. 1 and 2;

DETAILED DESCRIPTION OF THE PREFERRED EMBODIMENTS

Figure 4:
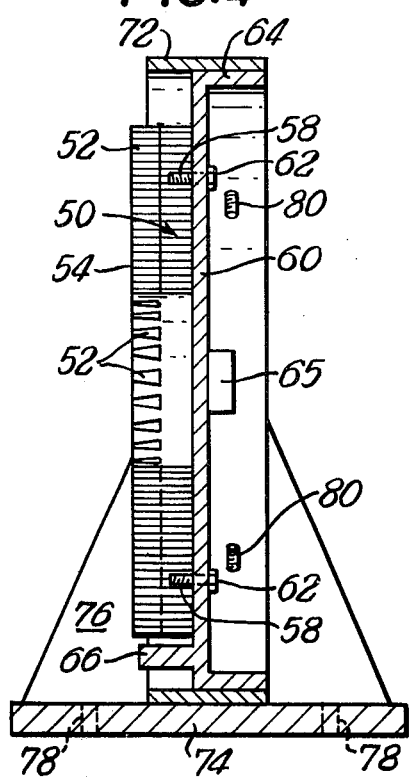
FIG. 4 is a cross-sectional view of the stator and support structure shown in FIG. 3, taken along the line IV—IV of FIG. 3, the windings being omitted for the sake of clarity.

A rotor for use in a first electric induction drive assembly in accordance with the present invention is shown generally in FIGS. 1 and 2 at 10. The rotor has an annular core 12 of laminated magnetic material, the core 12 being in the form of a continuously wound spiral of magnetic steel strip material. A plurality of bores or recesses 14 for rotor bars extend generally radially through the core 12 from the inner to the outer peripheries thereof. The bores 14 may be formed by drilling after the core 12 has been formed. In order to facilitate smooth running of the drive assembly, the bores 14 are not directed precisely radially but are skewed by one pole pitch. Although in FIG. 1 the bores 14 are shown in part only of the core, it should be appreciated that they are equally spaced apart around the entire core.

Through each of the bores 14 there extends a respective aluminium alloy rotor bar 16. At their inner and outer ends, the rotor bars 16 are integral with inner and outer aluminium alloy shorting rings 18 and 20, respectively. As will be appreciated, the rotor thus formed is a planar version of the cylindrical squirrel-cage rotor used in conventional cylindrical induction motors. Formed integrally with the outer shorting ring 20 is a dynamic balancing ring 22, which is in the form of a flange flush with a surface 24 (hereinafter referred to as the front surface) of the core 12; the dynamic balancing ring 22 also carries a plurality of cooling fan blades 26.

A hollow cylindrical steel boss 28 is securely fitted within the inner shorting ring 18, which ring is provided with an internal key-way 30, by means of which the rotor 10 can be fitted on to the shaft (not shown) of a machine to be driven. To secure the rotor 10 in place, the rear end of the boss 28 protrudes from the rear face 32 of the core 12 and is provided with at least one radially-directed fixing screw 34 disposed in a tapped hole 36 running through the boss 28. To cater for front fixing as well as or instead of rear fixing, the front end of the boss 28 may be recessed as at 38 and provided with at least one similar fixing screw 40 and tapped hole 42.

The rotor 10 shown in FIGS. 1 and 2 is manufactured as follows. The core 12 with the bores 14 therein is first formed. The rotor bars 16, inner and outer shorting rings 18 and 20, the dynamic balancing ring 22 and the fan blades 26 are then formed on the core 10 in a single centrifugal casting operation. The core 10 is rotated and a molten supply of the appropriate alloy is introduced into the centre and flows through the bores 14 into the casting mould. The boss 28 is bonded to the inner shorting ring 18 during the casting operation. This technique of centrifugal casting is already known for the formation of cylindrical squirrel cage rotors for use in conventional cylindrical induction motors and will therefore not be described further.

FIGS. 3 and 4 illustrate a stator and a support structure therefor designed to co-operate with the rotor shown in FIGS. 1 and 2 to form an electric induction drive assembly. The basic component of the stator is an annular laminated core 50. Like the rotor core 12, the core 50 is formed from a continuous spirally wound of magnetic steel strip. A plurality of radially-extending slots 52 are formed on one face 54 (hereinafter referred to as the front face) of the core 50. The slots 52 can be formed by stamping or by machining, e.g. milling. The slots 52 can be of any suitable configuration known to those skilled in the art: in FIG. 4 they are shown as having the well-known tapered form in which the mouths of the slots are narrower than the bases.

FIG. 3 shows how windings 56, previously made upon frames, are fitted into the stator core slots 52. As will be seen, in this particular arrangement there are four windings 56 whereby the drive assembly has four poles. Further, in the particular arrangement illustrated, the windings 56 for one phase only are shown. The arrangement of the windings will be described no further, as the present stator can be wound in a manner which is totally analogous to the winding of a conventional cylindrical stator and the choice of winding patterns and the way in which the core should be wired to obtain single or polyphase operation will be fully apparent to one skilled in the art.

After fitting the windings 56 to the core 50, the windings may be impregnated with varnish and baked, in conventional manner, to increase their resistance to moisture. The core and windings may, if required, be encapsulated in an epoxy resin.

The core 50 has four tapped holes 58 in the rear face thereof. The core is secured to a circular backplate 60 by means of four screws or bolts 62 which extend through clearance holes in the plate 60 and are screwed into the tapped holes 58 in the core 50. The outer periphery of the backplate 60 is provided with a circular flange 64, by means of which, as will be described below, the stator is releasably attached to the stator support structure. The windings 56 are wired to a terminal box 65 fitted to the backplate 60, whereby they may be energized by means of a supply cable also wired to the box.

Four cylindrical yokes 66 of a magnetic material are formed integrally with the backplate 60 as shown. If desired, the yokes 66 need not be integral with, but may instead be attached to, the backplate 60. The outer pole pitch traversing parts 68 of the stator windings, or at least such parts of some of the windings, have one-turn loops 70 formed therein, whereby when the stator windings are fixed in plate the loops 70 surround the yokes 66 as shown in FIG. 3.

The stator support structure comprises an open-ended cylindrical frame 72 which is welded to a flat base 74 and additionally supported by legs 76 welded to the frame 72 and the base 74. The base 74 has a plurality of holes 78 therein. The stator support structure and the stator can be secured in place, once they have been appropriately positioned, by passing fixing members through the holes 78.

The stator core and the backplate 60 are secured in place within the frame 72 by means of four radially directed screws or bolts 80 which pass through clearance holes in the frame 72 and are screwed into tapped holes in the flange 64.

Figure 5:
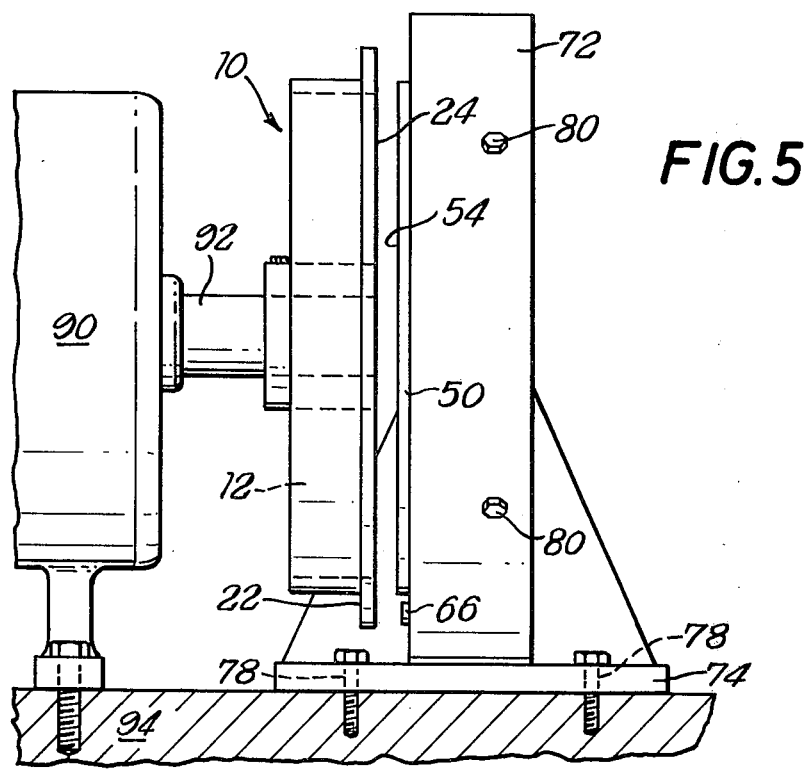
FIG. 5 is a side view of a drive assembly formed from the components illustrated in the preceding figures and arranged in the operable condition for driving a load, the cooling fan blades being omitted from the rotor for the sake of clarity.

FIG. 5 illustrates the components shown in FIGS. 1–4 brought together in the operable condition to form an electric induction drive assembly arranged to drive a load. In more detail, a load 90 having an input shaft 92 is secured to a resting surface 94, e.g. the frame of an item of process plant of which the load 90 forms part or the floor of a building in which such plant is housed. The rotor 10 is keyed on to the shaft 92 and secured in place by operation of the screw(s) 34 and/or 40, in like manner to the way in which a half-coupling would be secured to the shaft for it to be driven by a conventional electric motor having an output shaft provided with a corresponding half-coupling. The stator support frame is then moved with respect to the rotor such that the front surface 54 of the stator core 50 confronts the front surface 24 of the rotor core 12. The position of the stator support frame is adjusted until the two cores are substantially coaxial and the width of the air gap between the two facing surfaces 24 and 54 is substantially equal to the nominal air gap for the particular drive assembly. By way of example, in one form of drive assembly producing an output of 2 HP, the external diameter of the stator core is 7 inches and the air gap spacing is 2.5 mm. As was explained in some detail hereinabove, the above-mentioned alignment operation does not have to be conducted with great precision and can therefore be carried out by virtually unskilled personnel. Once the stator and support frame have been correctly positioned, the support frame can be secured in place by passing bolts or other fixing members through the holes 78 in the base 74 and into the surface 94. In the drawings, the load 90 and stator support frame have been shown mounted at the same level. As will be appreciated, should this not be possible due to the shaft 92 not being spaced by the desired amount above the load support surface, the part of the surface on which the stator support structure structure is mounted can be recessed or built up as necessary.

To operate the motor, electrical power is supplied to the stator windings which then produce a rotating magnetic field which extends axially away from the front surface 54 of the stator core 50 and into the rotor core 12. The field cuts through the rotor bars 16 and produces rotation of the rotor 10 at a speed somewhat less than the speed of rotation of the field, in a way totally analogous to the conventional cylindrical induction motor.

As was explained in detail hereinabove, whilst the drive assembly is running at its normal operating speed, there is a magnetic attraction between the rotor core and the stator core. In order to nullify this force (at least partially), so that excessive axial thrust is not imparted to the shaft 92, an electrodynamic repulsive force is developed. As will be seen from FIG. 5, the yokes 66 fixed to the stator back plate 60 confront the dynamic balancing ring 22 of the rotor 10. The field produced by the yokes induces currents in the ring 22 which produce a counter magnetic field leading to a repulsive force between the yokes and the ring. The repulsive force will vary with the current drawn by the stator, due to the fact that the field produced by the yokes 66 is dependent on the current in the stator windings. Therefore, as both the electromagnetic and electrodynamic forces are proportional to the current, the forces will nullify one another regardless of the current drawn by the motor.

Removal of the stator core from the drive assembly when the assembly is set up in the operable condition shown in FIG. 5, e.g. for replacement, cleaning or repair, is a very simple operation and can be carried out by unskilled personnel. All that is necessary is to unscrew the screws or bolts 80, whereupon the backplate 60 and stator core can be removed as a whole rearwardly from the frame 72. The cleaned or tested core or a replacement core can be inserted in the converse manner and will automatically be located in the correct position. If the stator core has burnt out and is to be replaced, or if a fresh core having a different number of poles is to be inserted to change the speed of the drive assembly, then provided a new core is at hand, the total down time of the assembly is literally 2 or 3 minutes only. The replacement core can either be already mounted on a new backplate so that the new core and backplate can be inserted, or, in order to reduce the cost of spare parts, the old core can be removed from the backplate and replaced by the new one simply by removing and replacing the screws or bolts 62.

Replacement of the stator core, in short, is quick and easy. There is no need to dismantle and/or disturb a housing. The means for releasing the core, i.e. the bolts or screws 80, and their manner of use, are immediately apparent to an unskilled person.

It will be seen that the rotor 10 revolves in free air and that air can circulate freely around the stator windings: there is no housing to restrict air circulation and thereby give rise to a high operating temperature. The assembly therefore operates at reasonably low temperature and in some cases the cooling fan blades can be entirely dispensed with, the assembly operating satisfactorily without forced cooling.

Figure 7:
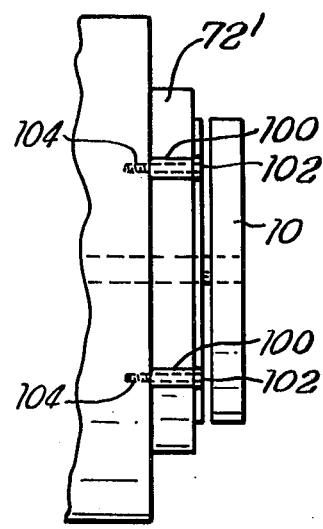
FIG. 7 is a largely schematic side view showing how a stator support structure like that of FIG. 6 is fixed in place.
Figure 6:
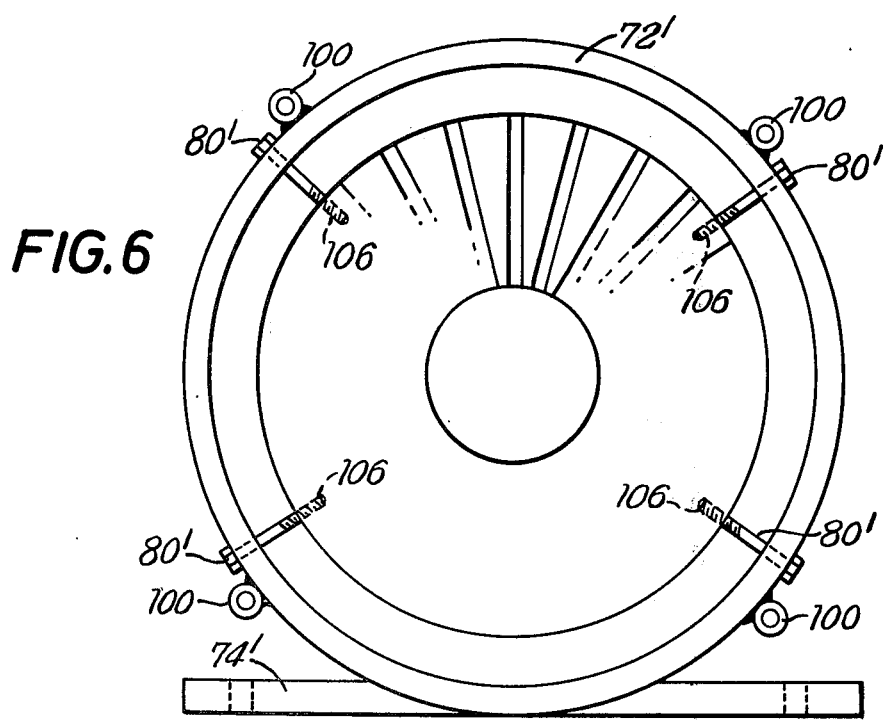
FIG. 6 is a view, corresponding to FIG. 3, of a modified stator and support structure and illustrates both an alternative way of mounting the stator in the support structure and an alternative means of fixing the support structure in place.

FIG. 6 of the drawings shows a modified stator and support structure. As will be seen, like the support structure previously described, it comprises a circular frame 72' secured to a flat base 74'. The modified structure can thus be installed in the same way as shown in FIG. 5. However, the modified structure is provided with an alternative mounting arrangement comprising four sockets 100 formed from short lengths of steel tube which extend axially of the stator core and frame and are welded to the outer periphery of the frame. If this alternative arrangement is used, the frame 72' can be secured to a surface extending perpendicularly of the axis of the frame, e.g. directly to the casing of a load, as shown in FIG. 7, by passing screws or bolts 102 through the sockets 100 and into tapped holes 104 in the surface. If this alternative mounting arrangement is used, it may be convenient or necessary to mount the rotor outside the support structure as shown in FIG. 7. Naturally, the inner diameter of the annular stator core will be arranged in this case to be sufficiently large so that the inner pole pitch traversing parts of the stator windings do not interfere with the shaft of the load. It will be apparent that, even if the rotor 10 is mounted outside the stator support structure as shown, replacement of the stator core is still a simple matter, the only extra operation being the simple removal and replacement of the rotor 10. It should be appreciated, however, that provided the surface to which the frame 72' is affixed is sufficiently recessed to take the rotor 10, it can be mounted on the inside of the stator support structure in a manner similar to the arrangement in FIG. 5.

If required, the modified structure of FIG. 6 need not be provided with the base 74': as shown in FIG. 7, it can instead be provided solely with the alternative mounting arrangement formed by the sockets 100.

FIG. 6 also illustrates an alternative way of mounting the stator core on the stator support structure. This alternative arrangement is described with reference to FIG. 6 solely for convenience and can prefectly well be incorporated in the stator support structure shown in FIGS. 3 and 4 instead of the arrangement there described.

In the modified arrangment, the backplate 60 is not provided. Instead, the stator core is provided with radial tapped holes 106. Bolts and screws 80' extend through clearance holes in the circular frame 72' and are screwed into the tapped holes 106. In this way, the stator is, as it were, suspended in space inside the frame 72'. Naturally, sufficient space must be left between the outer periphery of the core and the inside of the frame 72' for the outer pole pitch traversing parts of the stator core windings.

Figure 8:
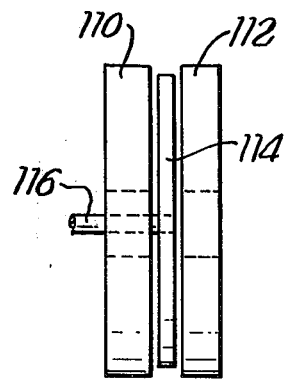
FIG. 8 is a largely schematic side view of a modified form of drive assembly wherein a pair of stators are arranged to drive a single rotor.

FIG. 8 shows in schematic form a modified arrangement in which a pair of like stators 110, 112 drive a single rotor 114 secured to a shaft 116. The two stators can be secured in position with respect to the rotor as previously described. The convenience of installation and of replacement of the stator core windings provided by the arrangements previously described are present in the arrangement of FIG. 8. To remove the stator windings, the core of the stator 112 is first removed as previously described. The rotor can then be released and withdrawn through the support structure of the stator 112 and the core of the stator 110 can then be released and withdrawn in the same manner.

Figure 9:
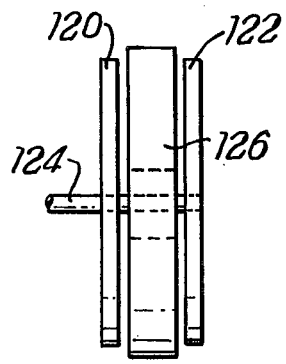
FIG. 9 is a largely schematic side view of another modified form of drive assembly wherein a single stator is arranged to drive a pair of rotors.

FIG. 9 shows a modified arrangement which is the converse of that of FIG. 8, i.e. in this case a pair of rotors 120, 122 each secured to a shaft 124 are driven by a single, "double-sided" stator 126. The double-sided stator has coil slots and windings on both faces of the core. This arrangement is more efficient than the single-sided stator previously described, due to double current loading of the unit. As was mentioned hereinabove, in the arrangement of FIG. 9, a particularly advantageous winding configuration enables a large amount of copper to be saved. This advantage is obtained by combining the two windings. A winding emerging from the outer periphery of the slot in one face, instead of being led around a large portion of the periphery of the core as in FIG. 3, is instead passed axially over the outer periphery of the core and is then led into a slot on the outer face of the core. As was explained before, with this winding arrangement a very large amount of copper is saved and the cost of manufacturing the stator core is therefore greatly reduced.

Naturally, with both the arrangements of FIG. 8 and FIG. 9, the windings on the stators or stator, respectively, must be so arranged that the separate torques produced are additive or undirectional on the shaft. Thus, for example, in the particularly advantageous winding configuration described above with reference to FIG. 9, as each conductor emerging radially outwardly from a slot on one face is immediately directed inwardly along a slot on the other face, the current in the parts of the windings in the slots is at any instant travelling in radially opposite directions on the two faces of the stator. Consequently, the rotating magnetic fields will be travelling in opposite rotational senses as viewed from the respective sides of the stator and therefore they will be travelling in the same sense as viewed from one side of the stator and will therefore produce a unidirectional torque on the rotor.

Both of the arrangements of FIGS. 8 and 9 may be multiplied as a sandwich to an indefinite extent, thereby indefinitely increasing the power output of the drive assembly, but without increasing the radial size of the overall unit or the centrifugal force to which the various parts thereof are subjected.

The various forms of drive assembly and features thereof specifically described above can be modified in many ways within the scope of the present invention. For instance, the shorting rings and rotor bars of the rotor need not be formed integrally in a centrifugal casting operation. The shorting rings can be discrete items fixed to the core, e.g. by heat shrinking, and the rotor bars can be discrete items laid in slots in the front face of the core, rather than in recesses therein, and can be brazed at their ends to the shorting rings.

The magnetic yokes 66 and the co-operating dynamic balancing ring 22 producing the electrodynamic force nullifying the electromagnetic attraction between the rotor and stator can be embodied in many ways other than that particularly described above. For example, any convenient number of yokes can be used. Also, the yokes can be distributed among the phases as regards energization, which arrangement may be particularly useful if the dynamic balancing ring is not continuous, e.g. if it is constituted by the cooling fan blades themselves.

The yokes 66 need not be of the circular cross-section shown. They can instead have any other suitable cross-section. A circumferentially elongate section such as a crescent may be advantageous in some cases, particularly if the dynamic balancing ring is not continuous, but formed by the cooling fan blades themselves. The yokes can be made sufficiently long in the circumferential direction to span a number of the blades, so as to ensure that the electrodynamic repulsive force is generated in a continuous manner.

In some instances, the annular core of the rotor and stator may not be of the near disc-like configuration shown. Instead, the ratios of the radial thicknesses of the cores to their outer diameters can be substantially decreased to provide cores which are in the form of rings of small radial thickness. In such a case, it may be convenient to form the cores by a different method than continually wound spirals. In an assembly modified in this manner, high efficiency, low speed and large torque can be obtained. As it is the area of the core surfaces which determines the power rating of the drive assembly and as the area of a circular surface increases in the radially outward direction, the loss in area caused by adopting this configuration can be easily compensated for by a very slight increase in the outer diameter of the cores.

In the arrangements particularly described above, the rotor has been formed like the half-coupling conventionally used for coupling electrical machines to drive shafts so that the rotor can conveniently be mounted on a shaft. However, it will be appreciated that in some special applications the rotor may be formed integrally with the shaft or secured to the shaft in some other way, or may even be incorporated in the load to be driven. For example, if the load has a flywheel the rotor can be built into the flywheel: or if the load is a pump or compressor, the rotor can be built into a rotary part (e.g. an impeller) thereof. The rotor can be immersed in many liquids and gases.

The stator core and windings can be replaced, without movement of the support structure, in other ways than those described above. For example, the core and windings may be arranged in a flat, cartridge form, not unlike a recording tape cassette, so as to be placed or slid into position on the support structure and there clipped or otherwise releasably secured in place.

In view of the fact that the rotor is a strong, solid mass and is virtually electrically indestructible, it can be used directly as a mechanical output component. For instance, gear teeth can be formed on the rotor on the outside or inside of the core or on the rear face and it can directly drive a gear train, for example forming the front gear in a gearbox.

The present drive assembly, as well as enabling quick and easy replacement of the stator core by one having a different number of poles, so as to change the operating speed, also enables the power rating of the assembly to be changed, viz. by replacement of the stator core with a smaller one having a lower power rating. Thus the speed and/or power output of the drive assembly can be changed at will.

For the sake of convenience only, the various forms of drive assembly described hereinabove have been illustrated and described as being installed in a horizontal position, i.e. for driving a load having a horizontal input shaft. It should be appreciated, however, that the drive assembly can also be installed to drive shafts which are vertical or inclined between the horizontal and vertical.

I claim:

1. An electric induction drive assembly for driving a rotatably supported load shaft as distinguished from a self contained independent motor comprising a rotor including an annular core of magnetic material having an end face, radially inner and outer shorting rings between which said core extends, a plurality of rotor bars each extending generally radially between said inner and outer shorting rings and means for mounting the rotor directly to a rotatably supported load shaft to be supported by the shaft for driving the shaft, stator means comprising an annular core of magnetic material having an end face and windings arranged on said core to produce a magnetic field extending axially from said end face of the core, a structure supporting said stator means for movement independently of said rotor so that, by appropriate positioning of the structure with respect to said load shaft said drive assembly may be made operable to drive said load shaft with the stator core having said énd face thereof confronting said end face of said rotor core, said stator means and said support structure, on the one hand, and said rotor, on the other hand, being entirely discreet components having no direct mechanical connections therebetween, and said stator support structure having means fixedly securing the stator means to the support structure and means defining an opening within the suppport structure of sufficient size to permit the stator means to be removed from and replaced on said support structure when the assembly is arranged in the operable condition, without movement of the support structure.

2. An assembly according to claim 1, wherein said stator support structure comprises a cylindrical frame open at both ends and having a plurality of radially directed apertures therethrough, one said open end comprising said opening for withdrawal and replacement of the stator means wherein said means releasably securing the stator means positions the stator core with said one face of the stator core adjacent the other open end of said frame, and wherein said means releasably securing the stator core comprise a plurality of threaded members which extend radially inwardly through said apertures in the frame and which are removable for releasing the stator core.

3. An assembly according to claim 2, wherein said stator means comprises a plate adapted to fit within the frame and having a plurality of tapped holes defined therein; said holes extending radially inwardly from the circumference thereof, and wherein said plate is secured in place by said radially inwardly extending threaded members which are screwed into said tapped holes in the plate, the stator core being secured to the plate with said face thereof remote from the plate.

4. The drive assembly of claim 2, wherein said stator support structure includes a flat base member on said cylindrical frame lying in a plane parallel to the axis of the frame.

5. The drive assembly of claim 4, wherein said base member has apertures therethrough and fasteners are received in the apertures for mounting the support structure to a surface lying in a plane perpendicular to the axis of the cylindrical frame.

6. The assembly of claim 2, wherein the cylindrical frame has attached thereto a plurality of axially extending sockets for receiving fasteners whereby the stator support structure can be secured to a surface lying in a plane perpendicular to the axis of the frame.

7. The assembly of claim 1, wherein a plurality of magnets adapted to be energized by the current flowing through the stator windings are fixed to the stator means and the rotor is provided with an electrically conductive nonmagnetic part confronting said electromagnets in the operable condition of the assembly whereby an electrodynamic repulsive force is produced between the rotor and stator in a direction opposing the electromagnetic attractive force between the rotor and stator when the assembly is operating.

8. The assembly of claim 3, wherein a plurality of magnetic yokes extend axially from a part of said plate between the outer periphery of the stator core and the cylindrical frame, pole pitch transversing parts of the stator windings are wound around said yokes and an electrically conductive nonmagnetic is disposed on the outer periphery of the rotor confronting said yokes in the operable condition of the assembly, whereby an electrodynamic repulsive force is produced opposing the electromagnetic attractive force between the rotor and stator in use of the assembly.

9. The assembly of claim 8, wherein the nonmagnetic part on the outer periphery of the rotor is a continuous ring lying in a plane perpendicular to the axis of the rotor core and cooling fan blades are formed integrally therewith.

10. The assembly of claim 1, wherein the stator core has slots on both faces thereof receiving said windings to produce magnetic fields extending axially away from both faces of the core and a second rotor of like construction is provided and said assembly being arranged such that each face of the stator core confronts a face of a respective one of said rotor cores and the stator windings are arranged so that both rotors are rotated in the same rotational sense.

* * * * *